(12) United States Patent
Cook

(10) Patent No.: US 11,998,114 B2
(45) Date of Patent: Jun. 4, 2024

(54) DISPLAY STAND CONNECTOR

(71) Applicant: HARRISON PRODUCTS CO LIMITED, Draycott (GB)

(72) Inventor: Douglas Cook, Moreton-in-Marsh (GB)

(73) Assignee: HARRISON PRODUCTS CO LTD, Draycott (GB)

( * ) Notice: Subject to any disclaimer, the term of this patent is extended or adjusted under 35 U.S.C. 154(b) by 222 days.

(21) Appl. No.: 17/620,104

(22) PCT Filed: Jun. 18, 2020

(86) PCT No.: PCT/GB2020/051466
§ 371 (c)(1),
(2) Date: Dec. 16, 2021

(87) PCT Pub. No.: WO2020/254805
PCT Pub. Date: Dec. 24, 2020

(65) Prior Publication Data
US 2022/0316507 A1 Oct. 6, 2022

(30) Foreign Application Priority Data
Jun. 18, 2019 (GB) ..................................... 1908734

(51) Int. Cl.
*A47B 96/06* (2006.01)
*A47B 47/06* (2006.01)
(Continued)

(52) U.S. Cl.
CPC ................ *A47B 96/06* (2013.01); *A47F 5/11* (2013.01); *F16B 12/12* (2013.01); *A47B 47/06* (2013.01)

(58) Field of Classification Search
CPC ......... A47B 4/06; A47B 96/06; A47B 96/068; A47B 2230/0077; A47B 47/06;
(Continued)

(56) References Cited

U.S. PATENT DOCUMENTS

| 2,123,621 A | 7/1938 | Adler |
| 4,389,133 A | 6/1983 | Oberst |

(Continued)

FOREIGN PATENT DOCUMENTS

| DE | 8914430 U1 | 5/1990 |
| EP | 2430947 A1 | 3/2012 |

(Continued)

OTHER PUBLICATIONS

GB Search Report dated Dec. 19, 2019 for GB Patent Application No. GB1908734.5, 6 pages.

(Continued)

*Primary Examiner* — Josh Skroupa
(74) *Attorney, Agent, or Firm* — Smith IP Services, P.C.

(57) ABSTRACT

A display stand connector can include a first part including a body member for attachment to a first part of a display stand and a protuberance extending from at least one surface of the body member. A second part of the display stand connector can include a base for attachment to a second part of the display stand, the base including a slot. The body member of the first part is locatable within the slot so as to connect the first and second parts of the display stand. The display stand connector is made from a pulp material.

10 Claims, 6 Drawing Sheets

(51) Int. Cl.
*A47F 5/11* (2006.01)
*F16B 12/12* (2006.01)

(58) Field of Classification Search
CPC .. A47F 5/11; A47F 5/112; A47F 5/116; A47F 5/118; B65D 5/48024; F16B 3/00; F16B 5/0036; F16B 5/0052; F16B 12/12; F16B 12/22; F16B 12/26; F16B 2200/30; Y10S 403/04; Y10S 403/10; Y10S 403/13; Y10T 403/61; Y10T 403/7073; Y10T 403/7094
USPC ............ 403/331, 375, 381, DIG. 4, DIG. 10, 403/DIG. 13; 312/259, 260, 261; 248/223.41, 301; 220/532, 533; 211/189, 195; 108/108
See application file for complete search history.

(56) References Cited

U.S. PATENT DOCUMENTS

| | | | |
|---|---|---|---|
| 4,430,947 A | 2/1984 | Kvame | |
| 4,787,595 A * | 11/1988 | Hegarty | B42F 13/402 248/458 |
| 4,828,133 A | 5/1989 | Hougendobler | |
| 4,925,146 A * | 5/1990 | Hegarty | B42D 17/00 248/458 |
| 5,044,594 A * | 9/1991 | Hegarty | A47B 19/10 248/458 |
| 5,080,238 A * | 1/1992 | Hochman | A47F 5/0869 211/106.01 |
| 9,644,653 B2 * | 5/2017 | Reiter | F16B 5/002 |
| D941,668 S * | 1/2022 | Kubica | D8/377 |
| 2009/0200200 A1 | 8/2009 | Trappani et al. | |
| 2011/0062095 A1* | 3/2011 | Tripodi | A47B 47/06 248/250 |
| 2012/0064279 A1 | 3/2012 | Henke | |
| 2019/0059583 A1 | 2/2019 | Sullivan et al. | |

FOREIGN PATENT DOCUMENTS

| | | | |
|---|---|---|---|
| EP | 2644059 A2 * | 10/2013 | ............ A47F 5/116 |
| GB | 1000169 A | 8/1965 | |

OTHER PUBLICATIONS

Cindy Hong; "Popular ABS PP Small Shelf Support Locking Clip for Retail PDQ Cardboard Displays Clip On Corrugated Corr-A-Clip Shelf Support", via Twitter app, dated Jun. 5, 2018, 2 pages.
Amazon; "Corrugated Shelf Support Clip—Corr A Clip—White—PDS3513 (500)", product order description via Amazon.com; accessed Sep. 12, 2019, 4 pages.
International Search Report with Written Opinion dated Aug. 4, 2020 for PCT Patent Application No. PCT/GB2020/051466, 16 pages.
Examination Report for UK application No. GB1908734.5, dated Jul. 17, 2023, 2 pages.

* cited by examiner

DISPLAY STAND CONNECTOR

CROSS-REFERENCE TO RELATED APPLICATIONS

This application is a national stage under 35 USC 371 of International Application No. PCT/GB20/51466, filed on 18 Jun. 2020, which claims priority to United Kingdom Application No. GB1908734.5 filed 18 Jun. 2019. The entire disclosures of these prior applications are incorporated herein by this reference.

This invention is a display stand connector intended for connecting together parts of a display stand.

Point of sale display stands are often manufactured from corrugated cardboard or similar, and comprise a rack, normally comprising upstanding side and back walls, an open front and top, and one or more shelves on which items for view and/or purchase are displayed. Such display stands are normally intended for relatively short-term use, and will often be decorated in the style of the products being displayed. As such, the display stand will normally be disposed of once that particular product is no longer being displayed.

Prior art display stands will normally be provided as a flat-pack cardboard net, which will be constructed on-site for use. The shelves are normally provided with two-part connectors, which are typically made from injection-moulded plastic. One part of the clip will be attached to one or more side and/or back wall of the display, and the other part of the clip will be provided on a shelf. To construct the display stand, the two parts of the plastic clips will be slotted together to attach the shelves to the walls. A typical display stand may contain a plurality of shelves, and therefore many clips will be required.

An issue arises when the time comes to dispose of the display stand, because the plastic connectors are either not recyclable, or at least need to be recycled separately from the display stand. This creates a problem in that significant time will need to be spent removing the plastic connectors from the display stand before it can be recycled. In such cases, the entire stand may be disposed of without being recycled.

According to a first aspect of the present invention there is provided a display stand connector.

According to a second aspect of the present invention, there is provided a display stand comprising a display stand connector.

There is also described a method of manufacturing a display stand connector according to the present invention.

According to the first aspect of the present invention there is provided a display stand connector, the connector comprising:
 a) a first part comprising:
  a body member for attachment to a first part of a display stand; and
  a protuberance extending from at least one surface of the body member;
 b) a second part comprising:
  a base for attachment to a second part of the display stand, the base comprising a slot;
  wherein the body member of the first part is locatable within the slot so as to connect the first and second parts of the display stand and wherein the connector is made from a pulp material.

The slot may be sized so that the body member can readily slid through the slot, but the protuberance cannot. Thus locating the body member within the slot such that the protuberance is on one side of the slot and the body member extends through, and projects from, the other side of the slot means that movement of the first part relative to the second part is restricted by the interaction of the slot and protuberance. This restriction of movement connects the first and second parts together in at least one direction.

Regarding the first aspect of the present invention, the body member of the first part may comprise opposed planar surfaces and side edges, and the at least one protuberance may extend from one planar surface. The shape and proportions of the body member of the first part can be adapted according to the intended use. Regarding the use of connecting shelving to the walls of a display stand, the body member may be generally rectangular and sized for attachment to a shelf. The at least one protuberance may be arranged at, or adjacent, a side edge of the body member. The at least one protuberance may comprise an elongate protuberance, or may comprise a plurality of protuberances and the elongate protuberance, or plurality of protuberances, may extend in a substantially linear manner. The elongate protuberance, or plurality of protuberances, may extend in a substantially linear manner in a direction substantially parallel with a side edge of the body member.

A single protuberance may be provided extending from a planar surface of the body member. In another example, a second protuberance may extend from the opposing planar surface of the body member. The second protuberance may be located opposite the first protuberance and may be substantially the same size and shape. In the case of two protuberances, a better grip, for example a more stable grip, with the slot may be obtained in use.

As will be discussed in more detail later, the first part may comprise a left hand section comprising opposed planar surfaces and side edges wherein the first protuberance extends from one planar surface, and a right hand section comprising opposed planar surfaces and side edges, the second protuberance extending from one planar surface. The left hand section may be a mirror image of the right hand section, and the left hand section and the right hand section may be conjoined at the planar surfaces opposite to the planar surfaces from which the protuberances extend. As will be discussed in greater detail later, the left and right hand section could be independently made and then conjoined, for example with an adhesive, heat sealing or other bonding method or agent. In another example a single piece comprising a left and right hand section joined along a side edge thereof could be made, and then folded together so that the protuberances protrude away from the body member. In this instance, the left and right sections could then subsequently be adhered together, for example with a glue, heat seal, or other method or agent. In some examples first part may include one or more apertures which extend therethrough. The one or more apertures could be arranged on the first part in any suitable pattern.

The second part may comprise opposed L-shaped walls extending from the base to define the slot and a cavity, although other suitable wall shapes are possible. This allows the slot to be arranged spaced apart from the base and allows a cavity to be defined between the slot and the base. This facilitates connection of the first and second parts. The slot may extend substantially parallel with a plane of the base. The at least one protuberance of the first part is locatable within the cavity. When connected, the protuberance is located within the cavity and the body member extends through the cavity away from the base. The protuberance may be sized to fit snugly within the cavity when the first and second parts are connected.

The slot may be open at one end, and closed at the other end permitting a sliding fit with the first part of the display stand connector so that the first part can be introduced at an end of the slot rather than the body member being pushed through the slot until the protuberance is reached.

The base of the second part may comprise a flange disposed around the walls of the slot. The flange may completely encircle the walls. The second part may comprise a single piece, with the walls extending out of the flange. In addition to L-shaped, or other shaped walls which space the slot from the base, a further wall joining the L-shaped walls at an end thereof may be provided to provide a closed end to the slot. In use in a display sand, the closed end may be arranged below the open end. The slot may be arranged so that it extends substantially vertically when in use.

In order to prevent the first and second parts from moving relative to one another, or at least restrict, or hinder that ability, once the first and second parts are connected in use, the first part may comprise a locating barb that extends from a side edge thereof. The barb may extend from a side edge to which the at least one protuberance is closest, which may be a side edge that extends parallel with the protuberance. The second part may comprise a backing member which underlies the base, the locating barb being disposed so that, when the first and second parts are connected, the locating barb is located against the backing member. To facilitate this the backing member may further comprise a locating hole or recess, so when the first and second parts are connected, the locating barb is located in the hole or recess. This may provide a positive confirmation of correct insertion of the first part into the second part and may also hinder removal of the first part from the second part. The backing member may comprise a raised portion, which is raised with respect to the plane of the backing member such that it extends into the cavity. The raised portion may further include a guide indentation or funnel which eases passage of barb into the locating hole or recess, for example by biasing the backing member away from the slot. The raised portion may be resiliently deformable to permit passage of the locating barb. The backing member may be biased towards the first part and/or the slot, when the locating barb is located in the locating hole or recess, so as to secure the first part in position.

The first and second parts may be made of a pulp material having a substantially uniform thickness, the thickness being in the range of 0.5-1.5 mm and preferably 0.8-1.2 mm and most preferably 1 mm. As explained in more detail later, in some embodiments the first or second parts may comprise at least two sections joined together, and in which case the thickness will be double.

The present invention is made from a pulp material. The pulp material may be wood pulp, bagasse or a combination thereof. Any pulp material that is recyclable alongside cardboard could be used, meaning that once used, a display stand would not need to be disassembled before being recycle. The pulp material may be compostable alongside the cardboard of a stand. Any adhesive or bonding method used to bond components of the first part, or components of the second part, may comprise a recyclable and/or a compostable agent, or at least may make use of an agent that does not prevent recycling and/or composting.

The invention extends to a display stand comprising a display stand connector as described above. The display stand may comprise a rack and a plurality of shelves. The rack and/or the shelves may be formed from a cardboard or carton board material. The rack may be provided with at least one second part of a connector. The second part of the connector may be secured to the rack, for example by adhesive, bonding or other method. At least one shelf may be provided with a first part of a connector to allow the shelf to be connected to the rack. The first part of the connector may be secured to the shelf, for example by adhesive, bonding or other method. Apertures through the first part may allow adhesive to pass through the first part and assist with bonding to the shelf, or other surface.

The first and/or second part may include one or more debossed and/or embossed indicia. The indicia may include logos, information symbols, lettering and/or other images.

The present invention will now be more particularly described, by way of example only, with reference to the accompanying drawings in which.

Figure 4A:
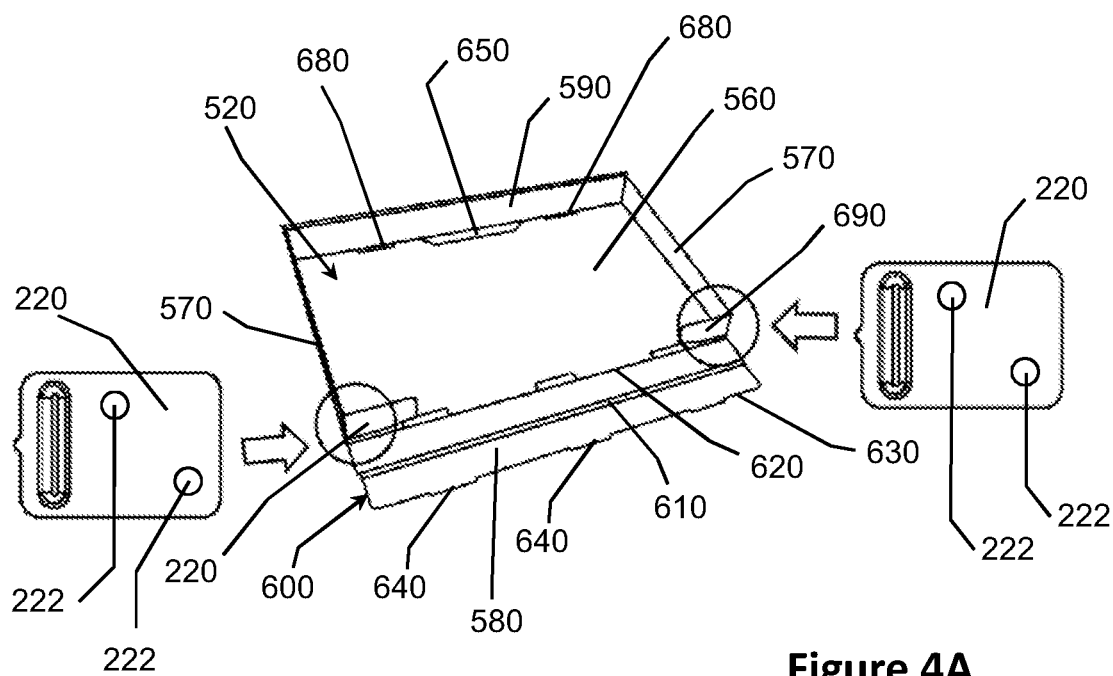
Figure 4B:
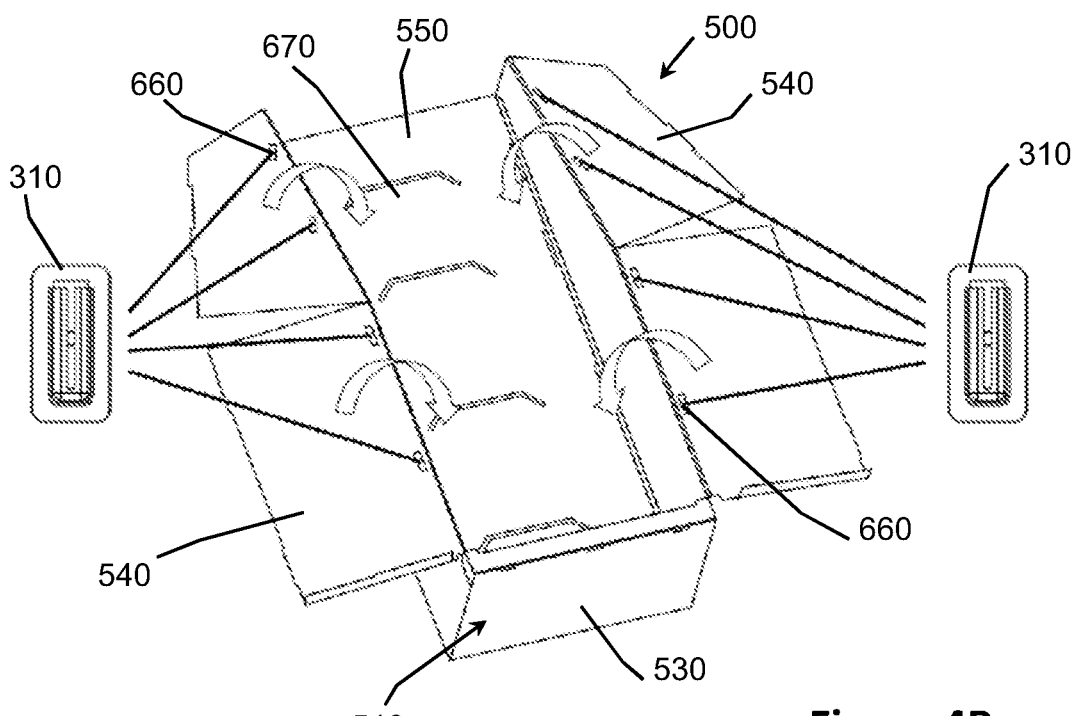
Figure 4C:
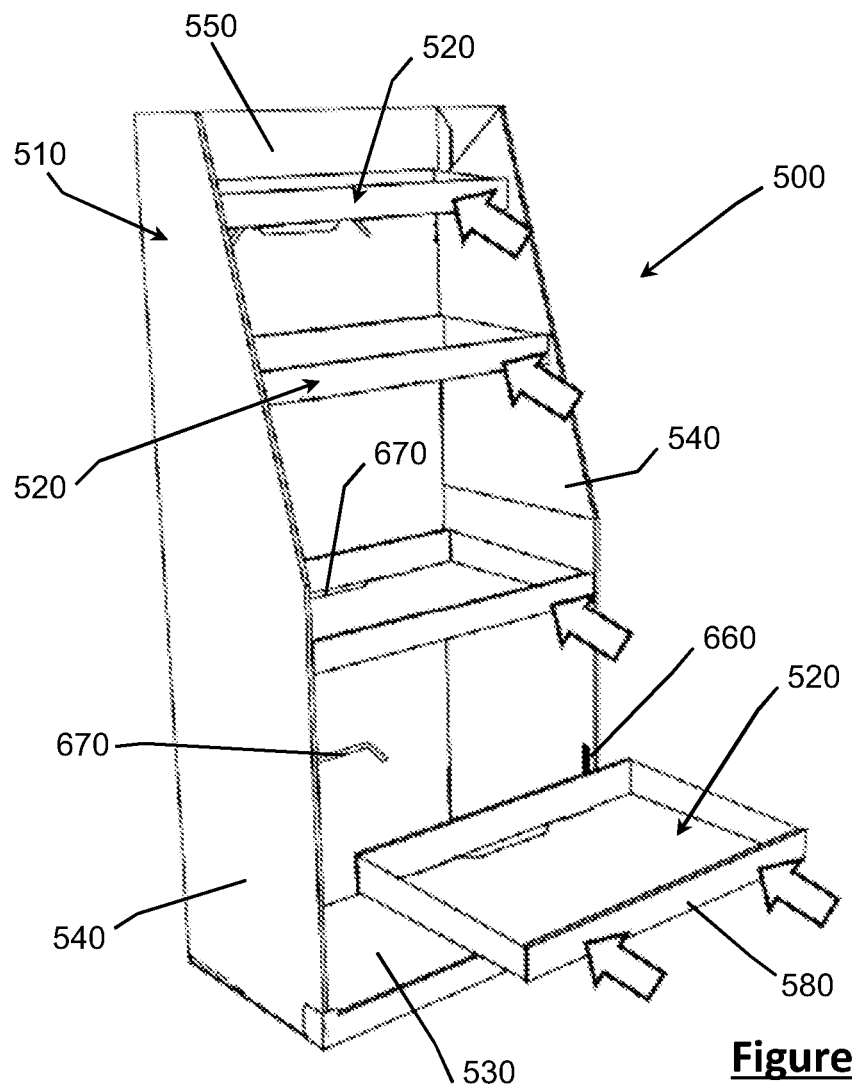
Figures 4D, 4E:
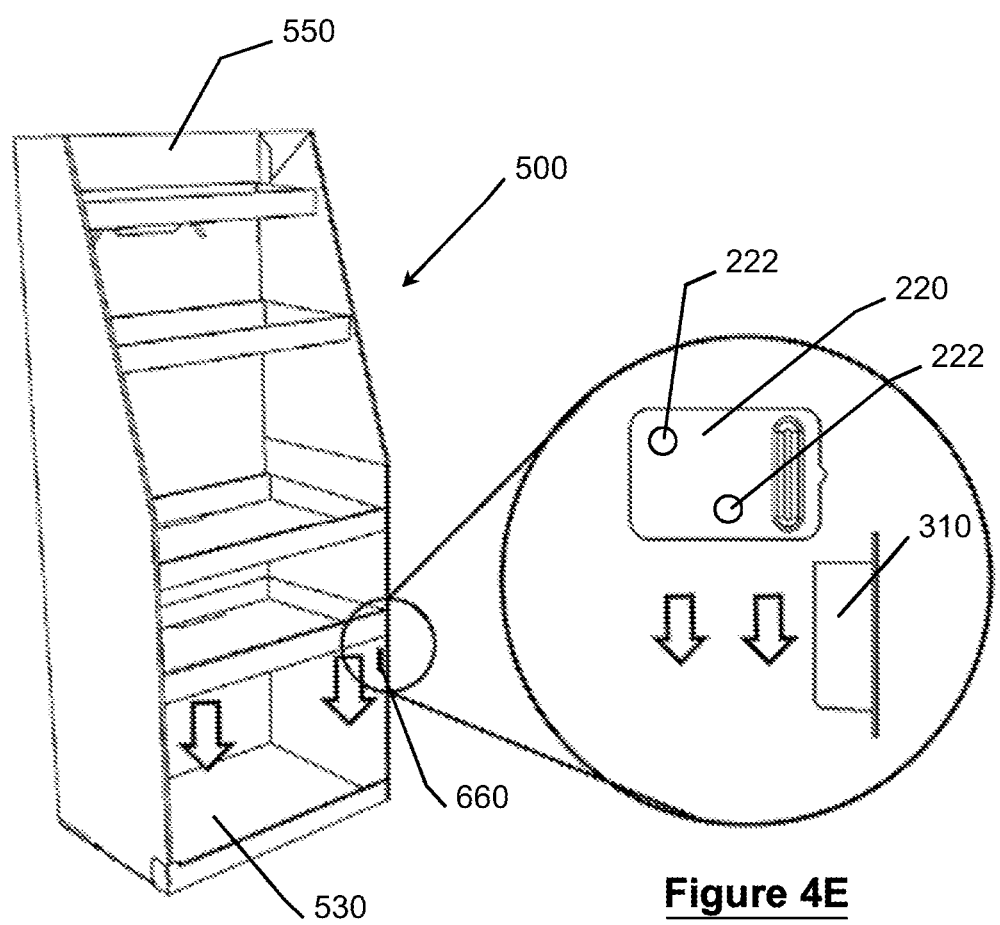
Figure 5:
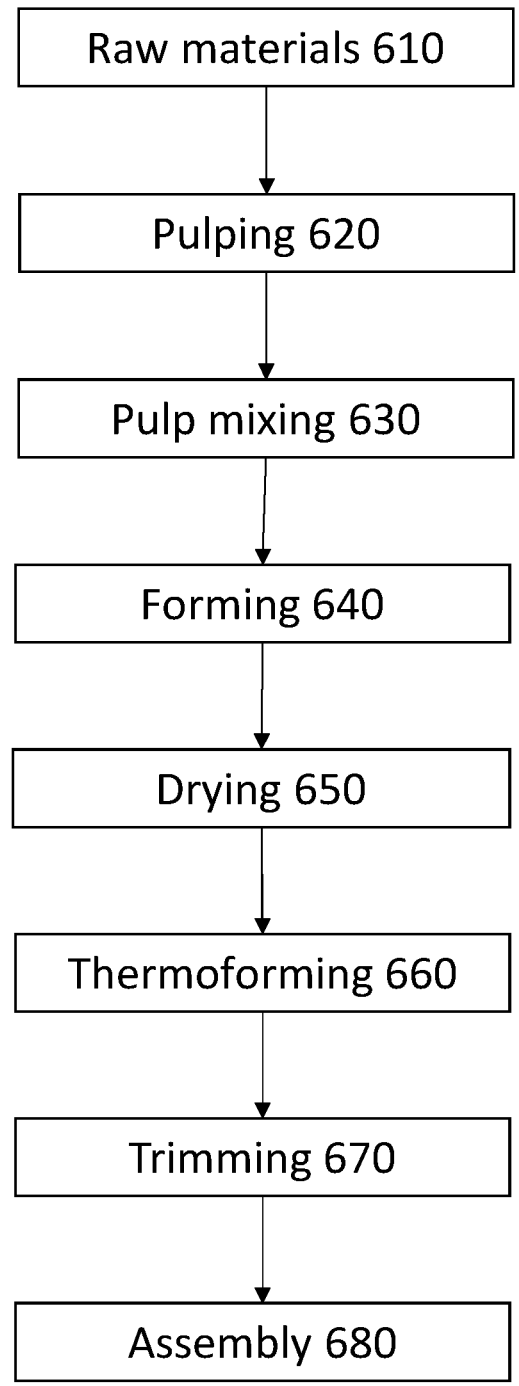

FIGS. 4A-E show a display stand being assembled with the display stand connector according to the present invention; and FIG. 5 shows a flow chart of the method of manufacture of a display stand connector according to the present invention.

Figure 1A:
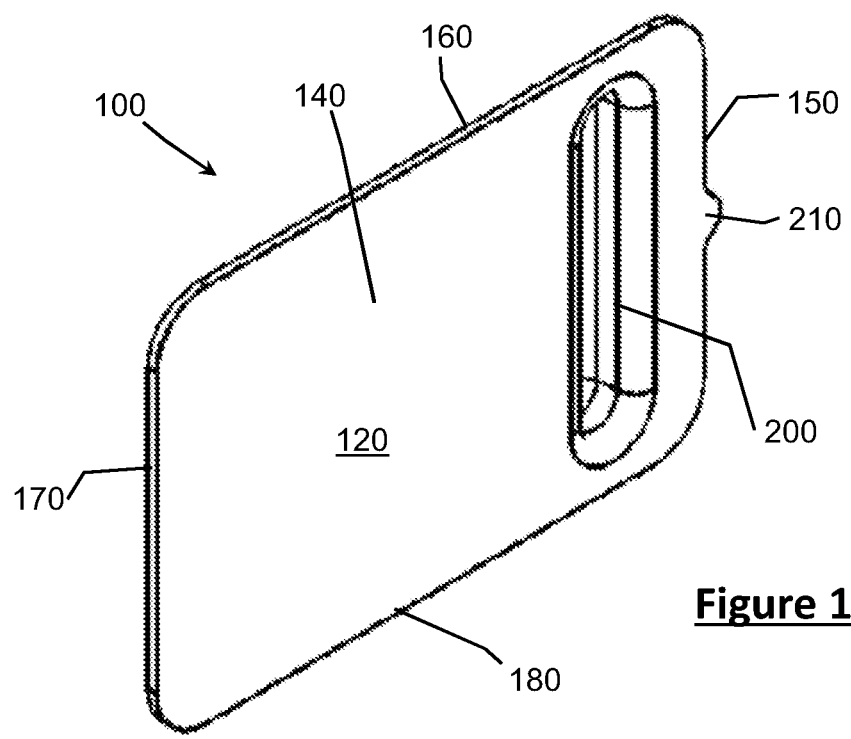
FIG. 1A shows a right hand section of a first part of a display stand connector according to the present invention.
Figure 1B:
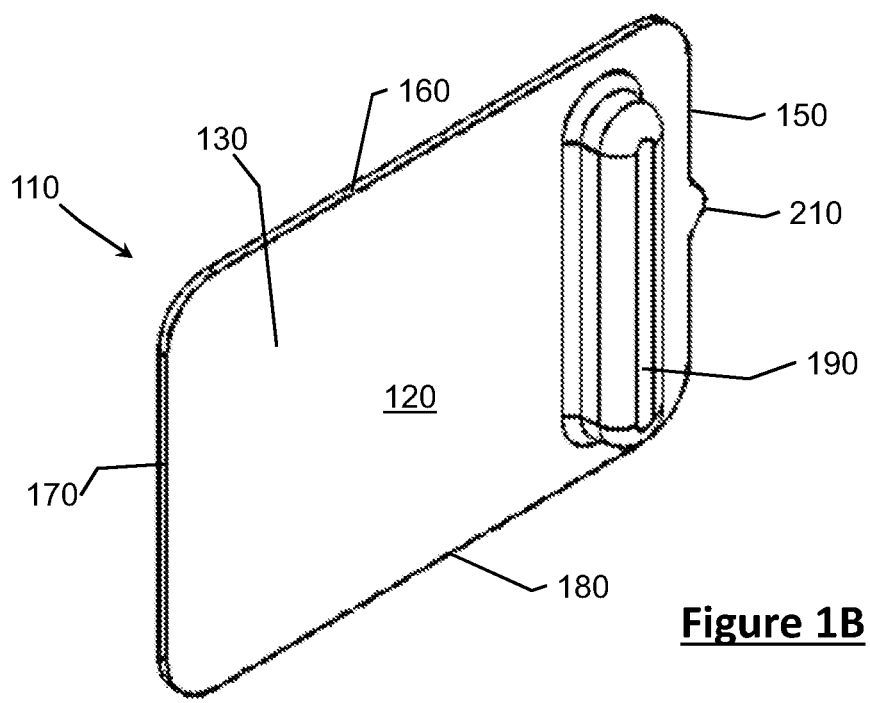
FIG. 1B shows a left hand section of the first part the display stand connector according to the present invention.

With reference initially to FIGS. 1A and 1B, there are shown right hand and left hand first sections of the first part of the display stand connector, generally indicated 100 and 110 respectively. In the present example, the right and left hand sections 100, 110 are identical, as well as being mirror images. Therefore, like reference numerals will be used in respect of both parts 100, 110. In alternative embodiments, the right and left hand parts 100, 110 may not be identical, but will still be mirror images.

The right and left hand sections 100, 110 comprise a body member 120, which comprises opposed planar surfaces 130, 140 and side edges 150, 160, 170 and 180. As shown in FIG. 1B, a protuberance 190 extends from planar surface 130 of the body member 120 of the right hand section 100. As shown in FIG. 1A, it can be seen that the protuberance 190 is hollow and that a cavity 200 extends from planar surface 140 of the body member 130 of the left hand section 110.

A locating barb 210 extends from a side edge 150 of both the right hand and left hand first sections 100, 110.

Figure 3:
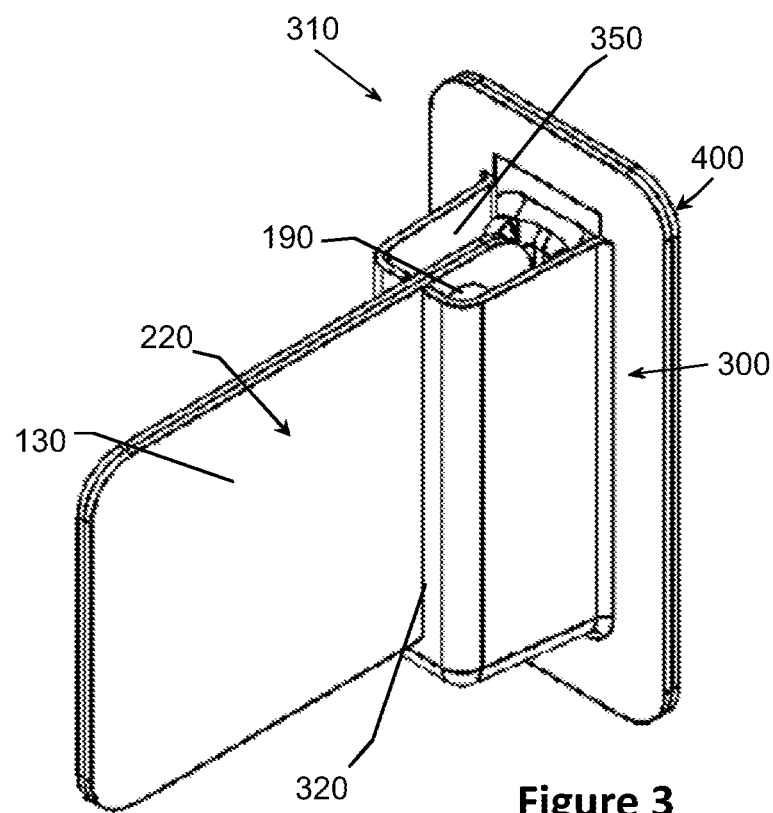
FIG. 3 shows the first and second parts of the display stand connector according to the present invention interconnected.

As shown in FIG. 3, in use the right and left hand sections 100, 110 are adhered together along planar surface 140 to make a single first part 220 having protuberances 190 extending from both opposed planar surfaces 130. In an alternative embodiment, the right and left hand sections 100, 110 are constructed as a single piece conjoined at a side edge thereof, and then folded together to form first part 220. Alternatively, the first part could comprise only a right or left hand section 100 or 110, with a protuberance 190 extending from only a single surface.

Figure 2A:
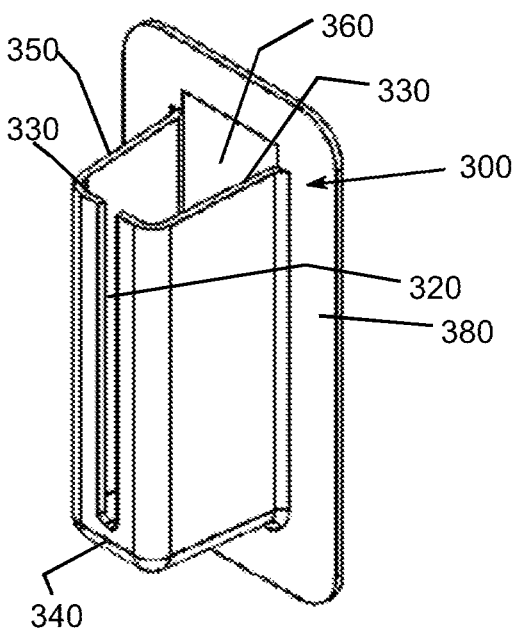
FIG. 2A shows a base of the second part of the display stand connector according to the present invention.

FIG. 2A shows a base, generally indicated 300, forming a section of a second part of the display stand connector, generally indicated 310. The base 300 is made from a single piece, and comprises a slot 320 formed from opposed L-shaped side walls 330, connected to back wall 340. The side and back walls 330, 340 define slot 320, cavity 350, aperture 360, and opening 370. Opening 370 is opposite to the back wall 340. The cavity 350, slot 320 and opening 370 are dimensioned so as to slidably receive the first part 220 and protuberances 190 in use. Surrounding the L shaped walls 330, back wall 340 and opening 370 is a flange 380, from which the walls 330, 340 extend.

Figure 2B:
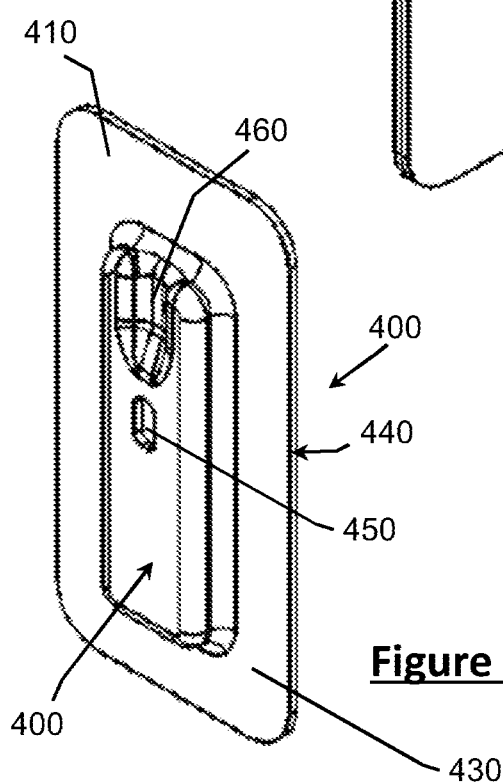
FIG. 2B shows a backing member of a second part of the display stand connector according to the present invention.

As shown in FIG. 2B, the second part 310 further comprises a backing member generally indicated 400. Backing member 400 is formed from a single piece, and comprises a flange 410, and a raised section generally indicated 420, which extends from the plane of the flange 410. Flange 410 comprises an upper surface 430 and a lower surface 440. Raised section 420 comprises an aperture 450 and a guide indentation or funnel section 460 terminating adjacent to the aperture 450.

In use, the base 300 and backing member 400 are conjoined. Flange 410 is dimensioned to mirror the flange 380 of the base 300, and the raised section 420 is dimensioned so as to fit within aperture 360 and partially within cavity 350. The underside of flange 380 is adhered to the upper surface 430 of flange 410.

In some embodiments, the second part 310 of the display stand connector comprises only the base 300 and not the backing member 400.

FIG. 3 shows the first part 220 and second part 310 connected together in use. To connect the first part 220 and second part 310, the planar surface 130 of the first part 210 is aligned with the slot 320 of the second part, and the first part 220 is slidably inserted into the second part 310. The protuberances 190 are pushed within the cavity 350. Locating barb 210 locates within the funnel section 460 as the first part 220 is slidably inserted into the second part 310 and causes the protuberances 190 to be pushed up against the underside of the L shaped walls 330. When the first part 220 has been pushed sufficiently into the second part 310, the locating barb 210 locates in aperture 450 of the raised section 420 of the backing member 400. The location of the locating barb 210 into the aperture 450, alongside the compression of the protuberances 190 against the L-shaped walls 330, maintains the first part 220 in place within the second part 310, requiring effort to disassemble the connector.

The first and second parts 220, 310 are made of a pulp material, comprising a mixture of wood pulp and bagasse. The pulp material may be wood pulp, bagasse or a combination thereof. Any pulp material that is recyclable alongside cardboard could be used, meaning that once used, a display stand would not need to be disassembled before being recycled FIGS. 4A-E show the connector according to FIGS. 1-3 in use in assembling a display stand. As shown in particularly in FIG. 4C, the display stand, generally indicated 500 comprises a rack, generally indicated 510, and a plurality of shelves 520. The exemplary display stand 500 is constructed from recyclable corrugated paper or cardboard.

Rack 510 comprises base 530, opposed upstanding side walls 540 and back wall 550. The front and top of the display stand are open so that goods displayed on the shelves 510 can be readily seen. In the positions within rack 510 where shelves 520 are to be disposed, there is provided opposed apertures 660 in side walls 540 and a flap 670 in the back wall 550.

Shelves 520 comprise generally rectangular base 560 and opposed upstanding side walls 570 and opposed upstanding front and back walls 580, 590. Shelves 520 are constructed from a single piece of cardboard net, as shown in FIG. 4A. Each wall 570, 580, 590 comprise wall section 600 with a fold line 610 arranged longitudinally along the length. One edge of section 600 is joined to a side edge of the base 560, along fold line 620 and the opposed side edge 630 of wall section 600 further comprises projections 640 which correspond to apertures 680 along fold line 620. Side walls 570 further comprise side flaps 690 which extend from one half of the wall section 600. One side edge of base 560, where it meets back wall 590, comprises an extended aperture 650.

To construct the shelves 520, the side walls sections 600 are folded along fold line 620, and projections 640 are inserted into apertures 680 to hold the side walls 570 in position. Side flaps 690 of side walls 570 are then folded to the side edge of the base 560 where it meets the front and back walls 580, 590. Back wall 590 is constructed by folding wall section 600 along fold line 610 and over side flaps 590, and projections 640 are inserted into apertures 680 to hold the back wall 590 in position.

Prior to constructing front wall 580, as shown in FIG. 4A, a first part 220 of the display stand connector is adhered or stapled to each of side flaps 690 which are positioned between the edge of base 560 where it meets front wall 580, so that the protuberances 190 extend beyond side walls 570. In the example first part 220 shown here two apertures 222 are included though the first part which may facilitate gluing of the first part 220 to the side flaps. The two apertures 222 are arranged with one adjacent a corner between a first edge and the protuberance and the other in a corner between a second edge, which is opposite the first edge, and an edge including the locating barb. Front wall 580 is then constructed by folding wall section 600 along fold line 610 and over side flaps 590 and first part 220, and projections 640 are inserted into apertures 680 to hold the back wall 590 in positon. Alternatively, first part 220 can be slotted into the side of front wall 580 after it is constructed. Further first parts 220 could also be provided in the back wall 590.

As shown in FIG. 4B, second parts 310 of the display stand connectors are inserted into apertures 660 in side walls 540 of the rack 510, with the opening 370 of the slot 320 facing upwards. Flaps 670 in back wall 550 of rack 510 are then folded down.

As shown in FIG. 4C, shelves 520 are slid into place, with flaps 670 in the back wall 550 of back wall 550 being inserted into the extended aperture in the back of each shelf. As shown in FIGS. 4D and 4E, the front of each shelf is secured by inserting the first part 220 of the display stand connector into the second part 310.

After use, the entire display stand can be dismantled and recycled, since the first and second parts 220, 310 are made of material that can be recycled alongside paper and cardboard.

An example method of manufacturing display stand connectors according to the present invention is shown in FIG. 5. In the first, second and third steps, 610, 620, 630, a pulp is prepared. Raw materials such as sugar cane, paper and natural fibres (for example those obtained from cotton, jute, flax, ramie, sisal, hemp) and the like are obtained, put into a beater with water and turned into a slurry and mixed to the proportion required for the display stand connector components.

At the fourth step 640, the connector components are formed, whereby the pulp slurry is placed into moulds. At the fifth step 650 and sixth step 660, the formed pulp is first dried (such as in a dry press) and then thermoformed under heat and pressed to remove moisture and dry the pulp.

The pulp components are then removed from the heat press where they are thermoformed, and trimmed to shape at the seventh step 670. At the seventh stage 670, the material will also be punched, such as to produce the slot 320 and the aperture 450.

At the display stand connector components are then assembled at the eighth step 680. In some examples, the first part of the display stand connector 120 will comprise a right hand and a left hand section 100, 120, which will be made separately, or formed together joined by a fold line. The right hand and a left hand section 100, 120 will be arranged together, either by placing them together or by folding about the fold line, and can then be adhered together, at the eighth step 680. A further optional step includes the right and left hand sections 100, 110 being further heat pressed to adhere the parts together, after which they may be further trimmed.

Base 300 and backing member 400 will also be combined to form the second part of the display stand connector 310 at the eighth step 680.

The invention claimed is:

1. A display stand connector, comprising:
  a) a first part comprising:
  a body member for attachment to a first part of a display stand, wherein the body member comprises a left hand section comprising opposed planar surfaces and side edges, and a right hand section comprising opposed planar surfaces and side edges; and
  a first hollow protuberance extending from a first one of the planar surfaces of the left hand section, wherein a second hollow protuberance extends from a first one of the planar surfaces of the right hand section, and wherein the second protuberance extends in a direction opposite from the first protuberance;
  b) a second part comprising:
  a base for attachment to a second part of the display stand, the base comprising a slot;
  wherein the body member of the first part is locatable within the slot so as to connect the first and second parts of the display stand, and wherein the connector is molded from a pulp material.

2. The display stand connector according to claim 1, wherein the left hand section is a mirror image of the right hand section.

3. The display stand connector according to claim 2, wherein:
  the first part comprises a locating barb that extends from one of the side edges; and
  the second part further comprises a backing member which underlies the base,
  the locating barb being disposed so that when the first and second parts are connected, the protuberance is located against the backing member.

4. The display stand connector according to claim 3, wherein the backing member further comprises a selected one of the group consisting of a locating hole and a locating recess, so that when the first and second parts are connected, the locating barb is located in the selected one of the locating hole and the locating recess.

5. The display stand connector according to claim 1, wherein the left hand section and the right hand section are conjoined at second ones of the left and right hand section planar surfaces opposite to the first planar surfaces from which the first and second protuberances extend.

6. The display stand connector according to claim 1, wherein the slot of the second part comprises opposed L-shaped walls extending from the base to define the slot and a cavity, and wherein the at least one protuberance of the first part is locatable within the cavity.

7. The display stand connector according to claim 6, wherein the slot is open at a first end, and closed at an opposite second end permitting a sliding fit with the first part of the display stand connector.

8. The display stand connector according to claim 6, wherein the base of the second part comprises a flange disposed around the walls of the slot.

9. The display stand connector according to claim 1, wherein the pulp material is selected from the group consisting of wood pulp, bagasse and a combination of wood pulp and bagasse.

10. A display stand comprising a display stand connector according to claim 1.

* * * * *